United States Patent [19]

Ljung

[11] Patent Number: 4,861,161
[45] Date of Patent: Aug. 29, 1989

[54] METHOD OF CONSTRUCTING A MOMENT INSENSITIVE PATHLENGTH CONTROL MIRROR ASSEMBLY FOR A RING LASER GYROSCOPE

[75] Inventor: Bo H. G. Ljung, Wayne, N.J.

[73] Assignee: Kearfott Guidance & Navigation Corporation, Wayne, N.J.

[21] Appl. No.: 169,668

[22] Filed: Mar. 18, 1988

[51] Int. Cl.⁴ .......................... G01C 19/64; H01S 3/08
[52] U.S. Cl. ..................................... 356/350; 372/107
[58] Field of Search ................... 356/350; 372/94, 107

[56] References Cited

U.S. PATENT DOCUMENTS

| | | | |
|---|---|---|---|
| 4,113,387 | 9/1978 | Shutt | 372/107 |
| 4,628,515 | 12/1986 | Rodloff et al. | 372/107 |
| 4,691,323 | 9/1987 | Ljung et al. | 372/107 |

Primary Examiner—Vincent P. McGraw
Assistant Examiner—S. A. Turner

[57] ABSTRACT

In a precision ring laser gyroscope, to eliminate the effect of an unwanted and unintentional moment generated as a result of a force being applied onto a pathlength controller, a pathlength control assembly is constructed to have optimal hub and diaphragm portions such that the mirror element mounted thereto does not tilt in response to the unintentional moment.

9 Claims, 3 Drawing Sheets

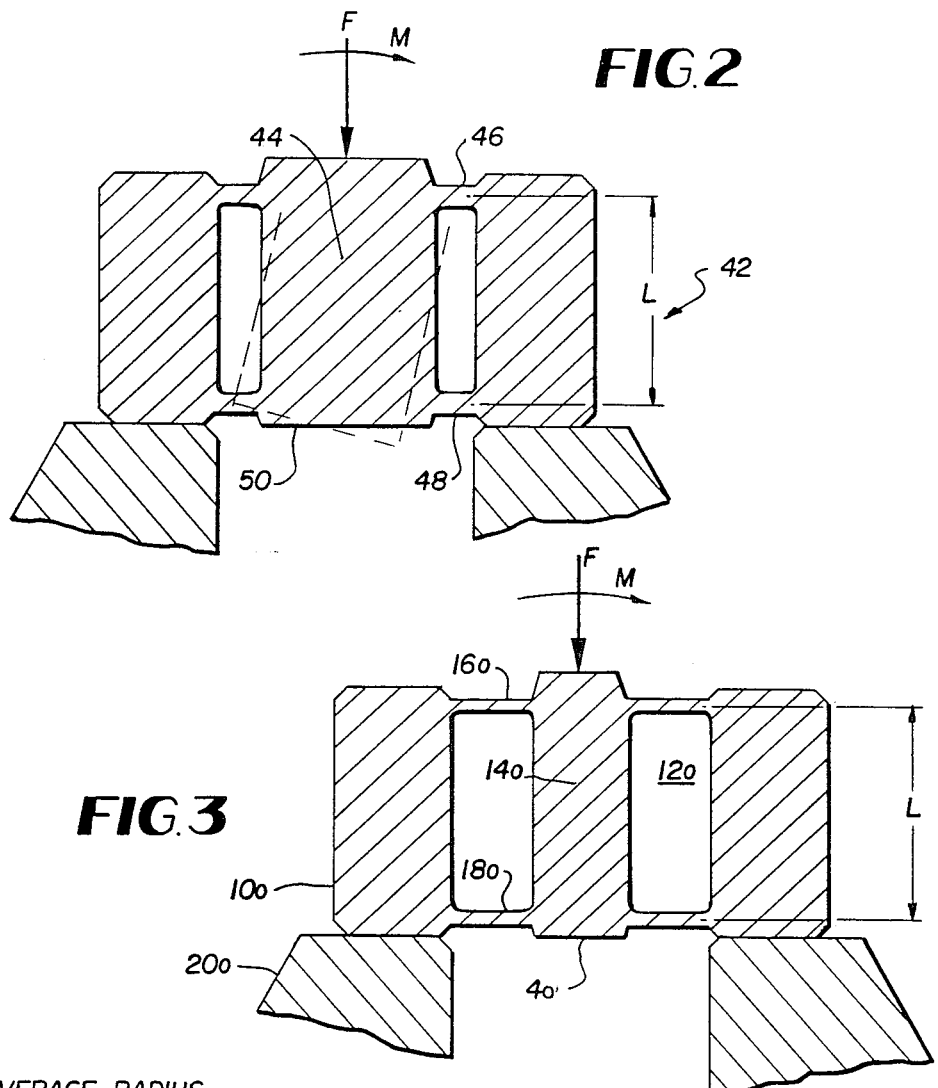
FIG.2
FIG.3
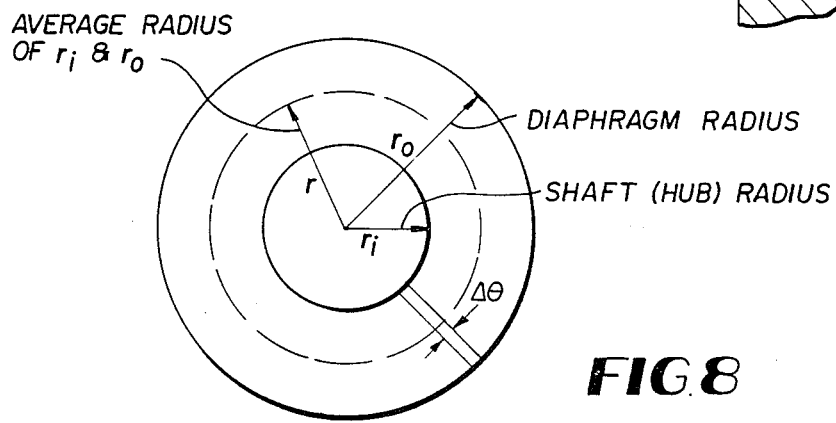
FIG.8

RADIAL COMPLIANCE OF DIAPHRAGM

SHEAR COMPLIANCE OF HUB

BENDING COMPLIANCE OF HUB

METHOD OF CONSTRUCTING A MOMENT INSENSITIVE PATHLENGTH CONTROL MIRROR ASSEMBLY FOR A RING LASER GYROSCOPE

FIELD OF THE INVENTION

The present invention relates to ring laser gyroscopes and more particularly to a novel method of manufacturing a pathlength controller that is insensitive to moments emanated from transducer means used for driving the mirror element of the pathlength controller.

BACKGROUND OF THE INVENTION

A ring laser gyroscope requires one or more adjustable mirrors in order to facilitate operation at the atomic gain center of the transition used for lasing. This is usually done in a closed servo fashion, where the tuning error or pathlength distance to the atomic gain center is measured and reduced to zero by translating the control mirror perpendicular to its mirrored surface. Such control mirror movement is known and has been described in, for example, U.S. Pat. No. 4,585,346, by the same inventor and assigned to the same assignee as the instant invention.

Such high accuracy ring laser gyroscope—of the type used for inertial navigation of aircraft, ships and missiles, etc.—usually uses long radius spherical mirrors, sometimes in combination with flat mirrors, in order to minimize the effects of back-scatter. Back-scatter, from the mirrors, is to some extent unavoidable, and its effects are to increase the noise or random walk of the instrument.

The choice of long radius mirrors decreases the laser acceptancel angle and therefore, excludes some of the back-scattered light. Unfortunately, the use of long radius mirrors makes the ring laser gyroscope quite sensitive to angular distortions. The mechanism for bias shift, as a function of angular distortion of the laser path, is rather involved, but is in essence comprised of sensitivity for Langmuir flow effects in the laser plasma in conjunction with imperfectly located gain bores.

The present day adjustable mirrors, for the ring laser gyroscope, are commonly translated by means of a piezoelectric transducer. The piezoelectric material used is usually lead-titania-zirconate, commonly referred to as PZT. In moving the control mirror of a pathlength controller in an in/out fashion parallel to its mirrored surace, these well-known piezoelectric transducers also, unfortunately, affect the control mirror with a moment. Such an unintentional moment is emanated from the less than perfect distribution of piezoelectric domains in the piezoelectric material. In the prior art control mirrors, this unintentional moment causes the control mirror to tilt a small, but unavoidable, amount, which in turn causes the ring laser gyroscope to respond with an indication of a rotation of the instrument about its input axis, even though no such input rotation has taken place.

SUMMARY OF THE PRESENT INVENTION

To eliminate the effect of the unintentional moment on the control mirror, the present invention method proposes the construction of a pathlength controller assembly that has appropriate proportions (for its components) such that it is not affected by the unintentional moment. Specifically, the present invention method concentrates on either changing the diameter of the hub (or shaft) of the assembly, in relation to preselected diaphragm thickness, or varying the distance between the different diaphragm portions of the assembly for manufacturing the optimal dimensions for the pathlength controller assembly, thereby effecting a moment insensitive mirror assembly, in spite of the existence of the unintentional moment.

It is thus an objective of the present invention method to manufacture an ideally proportioned pathlength controller assembly that is impervious to moments resulting from forces generated by the transducers on the assembly.

It is a further objective of the present invention method to manufacture a high accuracy ring laser gyroscope.

The above mentioned objects and advantages of the present invention will be more clearly understood when considered in conjunction with the accompanying drawings, in which:

BRIEF DESCRIPTION OF THE FIGURES

FIG. 1b is a free state diagram of the electrically excited piezoelectric transducers shown in FIG. 1a;

FIG. 2 is a simplified cross-sectional view of a pathlength controller whose hub tilts in a direction opposite to that shown in the FIG. 1a pathlength controller;

FIG. 3 is an illustration of a pathlength controller that is impervious to moments generated by a transducer means;

FIG. 8 is a cut away top view of the hub and diaphragm portion of a pathlength controller, with specific illustration of the radii of the hub and diaphragm portion.

DETAILED DESCRIPTION OF THE INVENTION

Figure 1A:
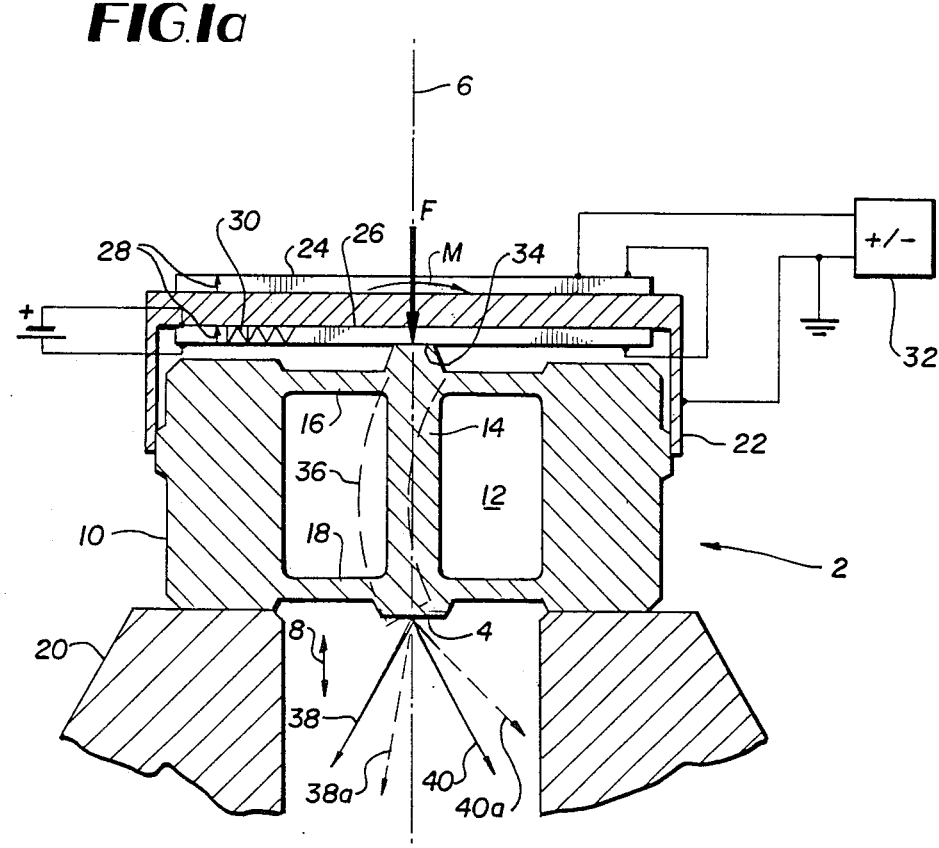
FIG. 1a is a simplified cross-sectional view of a ring laser gyroscope pathlength controller.

One of the most severe problems in a ring laser gyroscope is the angular (or tilt) instability of the pathlength controller assembly, an example of which is shown in FIG. 1a and designated as 2. One of the reasons for the assembly instability is that the mirror, such as 4, of the pathlength controller, has to be flexible so that, when a force F is applied by a transducer, the mirror moves along a symmetry line 6 in a rectilinear fashion so as to move parallel to itself in an in/out fashion, as illustrated by bidirectional arrow 8. A detailed discussion of this movement, as well as an in-depth discussion of such pathlength controller, is given in U.S. Pat. No. 4,691,323, incorporated by reference herein, having as one of its inventors the present inventor and assigned to the same assignee as the instant invention.

Continuing with FIG. 1a, it can be seen that the pathlength controller includes a block 10, which, as disclosed in U.S. Pat. No. 4,691,323, may be comprised of either a single diaphragm element or a combination of a diaphragm element and a circular mirror element. Be that as it may, block 10, as shown, has an internal annular cavity (or space) 12 for forming a central hub (or shaft or stub) 14. Annular space 12 further defines an upper diaphragm portion 16 and a lower diaphragm portion 18 transverse to control hub 14 in a spaced coaxial relationship. As shown, the previously mentioned mirror element 4 is mounted on a planar surface of assembly 2 that is encircled by lower diaphragm portion 18. The diaphragm portions 16 and 18 are axially spaced so as to make the resulting assembly extremely stiff when a tilting moment is encountered and yet relatively flexible to an axial force. Block 10 in turn is mounted to ring laser gyro block 20.

Figure 1B:
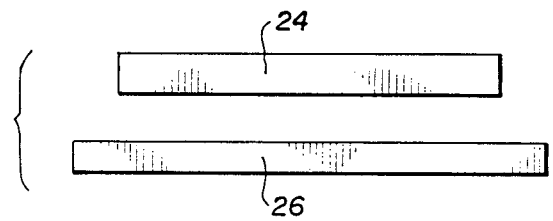

Also attached to pathlength controller assembly 2 is a cup-shaped fixture 22 that is preferably fabricated from a low expansion material such as Invar. Mounted to either side at the top portion of the cup are piezoelectric elements 24 and 26. These piezoelectric transducers are made froma lead-titania-zirconate material and are polarized, for example, in the directions as shown by arrows 28. Although thus polarized, piezoelectric domains such as 30 are less than perfectly distributed along the piezoelectric element. Therefore, in operation that is, when mirror 4 needs to be moved in the up and down direction, as shown by directional arrow 8, for controlling predefined pathlengths of laser beams 38 and 40 circulating within the ring laser gyro, the piezoelectric elements 24 and 26 are excited, by means of voltage supplied from a voltage source 32 which may be approximately ±150 volts. As a result, one of the piezoelectric elements will become shorter while the other piezoelectric element will become longer, depending upon the polarity being applied, as illustrated in FIG. 1b. It should be noted that although the lengths of the respective piezoelectric elements may change, their volumes remain constant. Accordingly, as shown in FIG. 1b, the height h1 of element 24 is larger than height h2 of element 26.

Figure 1C:
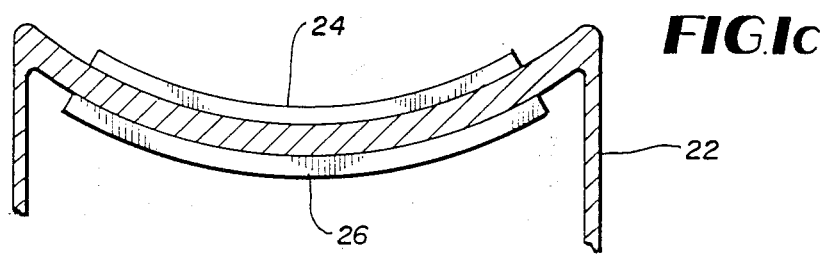
FIG. 1c illustrates an oil canning effect of a transducer means for a ring laser gyroscope pathlength controller by virtue of the electrically excited transducers.

But since the piezoelectric elements are bonded to the top portion of Invar cup 22, an "oil canning" effect, shown in FIG. 1c, takes place, thereby generating force F against portion 34 of block 10, which in turn moves hub 14 downward. As is well known, the reason for moving hub 14, and thereby translatedly deflecting mirror element 14, is to maintain the scale factor for the ring laser gyro. Also well documented is that the ring laser gyro is extremely sensitive and a change of even a couple of wavelengths cannot be tolerated, as for example when the gyro is first turned on. In effect, the translated deflection is meant to offset the thermal expansion of block 10, albeit block 10 is made from a material such as Zerodur, which has a very low expansion coefficient.

Yet still, unfortunately, the force thus applied by piezoelectric transducing elements 24 and 26 affects diaphragms 16 and 18 with an unintentional moment, labeled M. This moment is caused, essentially, by the tendency of a few of the previously discussed domains to switch their polarization. Consequently, moment M in face causes hub 14 to deform per dotted shape 36, which has been greatly exaggerated for clarity. As a result, mirror element 4, or more precisely, the surface of mirror element 4, is tilted as shown. Naturally, beams 38 and 40 are likewise altered, as shown by dotted lines 38a and 40a, respectively.

Ignoring for the moment the length of the stub, between the upper and lower diaphragm portions, the inventor has found that, for a different pathlength controller, such as shown in FIG. 2, that if its stub 44 and diaphragm portions 46 and 48 are different fromm those of the earlier discussed controller 2, even if the force and unintentional moment M generated by the piezoelectric transducer elements remain the same, the mirror element, such as 50, tilts in a different direction from that of the earlier discussed assembly 2. Putting it another way, the inventor has found, assuming that there is an unintentional moment M, the smaller diameter hub 14 bends while the larger diameter hub 44 remains rigid, thereby causing the respective mirror elements to tilt at opposite directions.

From this discovery, it was realized that there has to be an optimal diameter for the hub of the pathlength controller, given that the thicknesses of, as well as the distance between, the upper and lower diaphragm portions are known. And from this realization a pathlength controller assembly having the optimal dimensions, as shown in FIG. 3, is obtained. It shoudl be noted that the dimensions of the diaphragm portions, as well as the hub, are between those of the respective assemblies of FIGS. 1a and 2. For illustration purposes, the different components of the FIG. 3 assembly have been labeled as those shown in FIG. 1a, but with an "O" added thereto to designate that these components have optimal dimensions. It should further be noted that, for the sake of simplicity, the piezoelectric transducer elements and the Invar cup have been left out of FIGS. 2 and 3.

Further elaborating on the preferred pathlength control assembly of FIG. 3, it should be noted that the components thereof have proportions which are selected between those illustrated in the FIGS. 1a and 2 assemblies so that the surface of mirror element 4o does not tilt even when the control mirror is subjected to the unintentional moment M. This moment insensitive assembly results from the fact that the angular tilt of the mirror surface, due to moment M, is comprised of two components, which are of unequal signs (or opposed senses) and are made to have equal magnitudes, thereby cancelling the respective deleterious effects of the FIGS. 1a and 2 assemblies. These deleterious effects include: first, the bending of the hub; and, second, the deformation of the diaphragm portions when the hub, due to its larger diameter (in FIG. 2), is considered a rigid body.

It has further been discovered that an optimally proportioned pathlength controller may be obtained, given a standard diameter hub and diphragm portion thickness, if the distance between the diaphragm portions, i.e. the length of the hub, is varied. A detailed analysis for calculating the optimal length of the hub is given below. It should be appreciated that by manipulating the equations which follow, a person skilled in the art should also be able to calculate the optimal diameter for the hub, given that the diaphragm portion thickness is predetermined (or preselected) and that the distance between the diaphragm portiions is kept constant.

Figure 4:
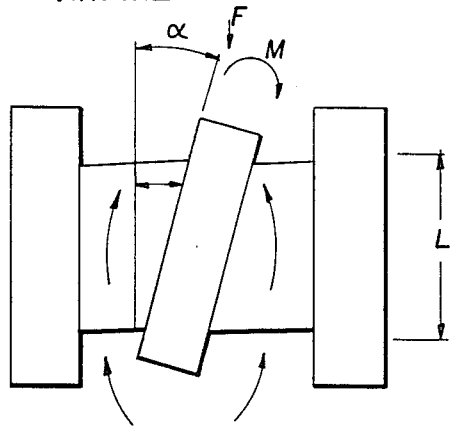
FIG. 4 is a free state diagram of the radial compliance of the diaphragm portions of a pathlength controller.
Figure 5:
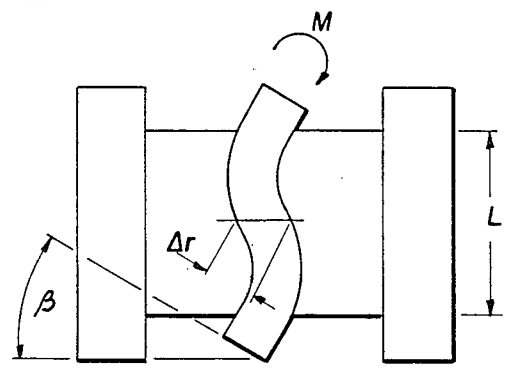
FIG. 5 illustrates in free state from the shear compliance of the hub of a pathlength controller.
Figure 6:
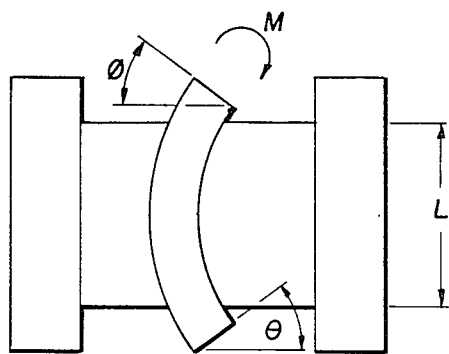
FIG. 6 is a free state illustration of the bending compliance of the hub of a pathlength controller.

With reference to FIGS. 4, 5 and 6, a detailed discussion on how to obtain an untiltable mirror surface, despite the presence of a moment, is given below.

It has been found that there are three major compliance terms which need to be considered. These are: (1) the radial compliance of the diaphragms; (2) the shear compliance of the hub; and (3) the bending compliance of the hub. These compliance terms are represented respectively in FIGS. 4, 5 and 6. To begin, it can be seen that the angular tilt due to the radial compliance of the diaphragm may be gleaned from FIG. 4 as follows:

$$\alpha = \frac{\Delta r}{L} \quad (1)$$

Also, the following force equation can be obtained.

$$\Delta r = F(C_1 r + C_2 r) \quad (2)$$

where $C_1 r$ and $C_2 r$ are the radial compliances of the diaphragms; and $k_1 a$ and $k_2 a$ (from FIG. 4) are the angular stiffnesses of the diaphragms.

From the consideration of the moments involved, the following expression is obtained:

$$F = \frac{M - \alpha(k_1 a + k_2 a)}{L} \quad (3)$$

Substituting equations 1 and 2 into 3, the following equation is obtained:

$$\frac{\alpha L^2}{C_1 r + C_2 r} = M - \alpha(k_1 a + k_2 a) \quad (4)$$

Manipulating equation 4, the angular tilt due to the radial compliance of the diaphragm is given hereinbelow:

$$\alpha = \frac{M}{\frac{L^2}{C_1 r + C_2 r} + k_1 a + k_2 a} \quad (5)$$

The shear compliance of the hub can be obtained from the following formulas gleaned from FIG. 5:

$$\beta = \frac{\Delta r}{\frac{L}{2}} \quad (6)$$

$$\Delta r = Ff\left(\frac{L}{2}\right)\left(\frac{1}{GA}\right) \quad (7)$$

Where
G = the shear compliance;
A = the area of the hub and
f = the shear factor which is equal to 10/9.

From the well known relationship between force and moment, the following equation is obtained:

$$F = \frac{M - \beta(k_1 a + k_2 a)}{L} \quad (8)$$

And by substituting equation 6 and 7 into equation 8, the angular tilt due to the shear compliance of the hub is obtained:

$$\beta = \frac{M}{\frac{GAL}{f} + k_1 a + k_2 a} \quad (9)$$

Figure 7:
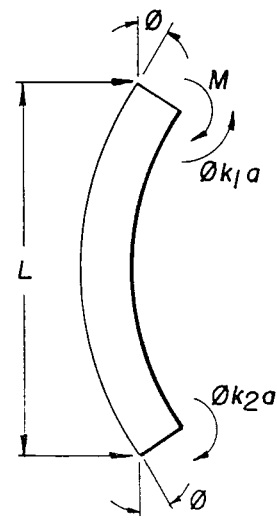
FIG. 7 is a simplified force diagram of the FIG. 6 bending compliance illustration.

Referring to FIG. 6, the bending compliance of the hub can be determined. To simplify the calculation of the bending compliance, the FIG. 6 diagram is converted to the equivalent simple supported shaft with moments applied to one end, as shown in FIG. 7. From the free body diagram of FIG. 7, for a moment at one end, the angle at the end where the moment is applied, as well known to one skilled in the theory of elasticity, is LM/3EI. At the other end, the angle becomes LM/6EI where M is the moment, E is the well known Young's modulus and I is the modulus of elasticity for the hub material. From this, the following equation may be obtained:

$$\theta = \frac{L(M - \phi k_1 a)}{6EI} - \frac{k_2 a \theta L}{3EI} \quad (10)$$

Assuming that the angular stiffness of the diaphragm is relatively small, compared to the hub stiffness, then angle $\phi$ would be approximately $2\theta$. With this assumption, equation 10 becomes the following:

$$\theta = \frac{L(M - 2k_1 a)}{6EI} - \frac{k_2 a \theta L}{3EI} \quad (11)$$

A manipulation of equation 10 would result in the following equation:

$$\theta = \frac{L M}{6EI\left(1 + \frac{Lk_1 a}{3EI} + \frac{Lk_2 a}{3EI}\right)} \quad (12)$$

which is the bending of the hub due to a moment M.

Next, it should be realized that the angle of the mirror, with respect to the tilt thereof, is equal to the following equation:

$$\text{mirror angle} = \frac{\alpha + \beta - \theta}{M} \quad (13)$$

From equation 13, it can be seen that by modifying the length of the hub, its diameter and the stiffnesses of the diaphragms, the sum of equation 13 can be made to equal 0, i.e. zero tilt.

Bearing equation 13 in mind, the following sample calculation, with reference to FIG. 8, which is needed in order to find out the radial stiffness of the diaphragm portions, is given. In FIG. 8, it can be seen that $r_i$ represents the outside diameter of the hub, $r_o$ represents the outer diameter of the diaphragm, r represents the average radius of $r_i$ and $r_o$, and $\Delta\theta$ represents a small section of the diaphragm. Since radial stiffness is the sum of shear, tension and compression stiffnesses the following equation can be obtained from FIG. 8:

radial stiffness Kr =

$$4\int_0^{\pi/2} \frac{\sin\theta d\theta r Et}{(r_o - r_i)} + 4\int_0^{\pi/2} \frac{\cos\theta d\theta r Gt}{(r_o - r_i)} \quad (14)$$

where t equals the thickness of the diaphragm.

Manipulating equation 14, the following equation is obtained:

$$Kr = \frac{8}{\pi} \frac{(G + E)tr}{r_o - r_i} \quad (15)$$

Now assume that $r_o$'0.35 inches; $r_i = 0.1$ inches; t = 0.26 inches; E = 13.1 × 10^6 lb./inches²; G = 5.3 × 10^6 lb./inches²; r = 0.225 inches; and $r_o - r_i = 0.25$ inches. $K_r$, from equation 15, would then equal 1.096 × 10^6 lbs./inch. And sinxce $C_1 r = L/k_r$, then $C_1 r$ would equal to 0.912 × 10^{-6} inch/lb.

For the angular stiffness of the diaphragm, from the book entitled *Formulas for Stress and Strain* by Raymond Roark and Warren C. Young, McGraw-Hill 1975, the angular stiffness of a plate with moment applied at its center has the following equation:

$$M/\theta = \alpha E t^3 \quad (16)$$

where $\alpha$ for a ratio of $r_o/r_i$ is 3.5. And for a ratio of $r_o/r_i$ of 3.5, $\alpha$ is 2.56, given E equals to $13.1 \times 10^6$ and t equals to 0.026. From the above, the angular stiffness of the diaphragm can be equated by $k_1.a = M/\theta$ which in turn equals 589 inch/lb. radian.

Having thus calculated the radial stiffness of the diaphragm and the angular stiffness of the diaphragm, the next calculation needed is the shear compliance of the hub. For this calculation, it is assumed that L=0.29 inches; r=0.1 inches; $G=5.3\times10^6$; $A=0.1^2 \times \pi = 0.03142$ inches$^2$; f=10/9; $k_1a = k_2a = 589$ inch-lb./radian; and $LGA/f = 0.0435 \times 10^6$. And from equation 9, $\beta/M = 22.4 \times 10^{-6}$ radian/inch-lb.

Next, the angular compliance due to the radial compliance of diaphragm can be calculated from equation 5 with $\alpha/M = 21.1 \times 10^{-6}$ radian/inch-lb.

Next, the bneding compliance of the hub can be calculated from equation 12 as $\theta/M = 4.23 \times 10^{-6}$ radian/inch-lb.

Thus, for the first calculation, the angular tilt of the mirror is, according to equation 13, $1.2 \times 10^{-6}$ radian, given that $\alpha = 21.1 \times 10^{-6}$ radian, $\beta = 22.4 \times 10^{-6}$ radian and $\theta = 42.3 \times 10^{-6}$ radian.

In order to obtain the optimal length of the hub, a second presupposed length needs to be calculated. For this second calculation, a length of L=0.30 inches is chosen, with the remaining numbers being the same, that is t=0.026, $E=13.1\times10^6$, $G=5.3\times10^6$, $r_2=0.1$, $k_1a=589$ inch.-lb./radian, $C_1r=0.912\ 10^{-6}$ and f=1.11. A then becomes $19.8\times10^{-6}$, $\beta$ becomes $21.7\times10^{-6}$ and $\theta=43.6\times10^{-6}$. The summation of these compliance terms, in accordance to equation 13, results in $\theta=-2.1\times10^{-6}$ radian.

Finally, by extrapolating between lengths L=0.29 and L=0.3, The length of zero tilt (for the mirror) can be obtained as follows:

Δ change=1.2 (from the first calculation)+2.1 (from the second calculation)=3.3.

The required change is 1.2. Therefore, 1.2 divided by 3.3×0.10 would yield 0.0036 which, when added to the length L=0.29, yields a length L of 0.2936 inches for a zero tilt.

From the just concluded detailed analysis, it should be clear that an optimally proportioned pathlength controller assembly can be obtained by manipulating the length of the hub, given that the thickness of the diaphragm portion(s) and the diameter of the hub have been either predetermined or previously chosen. On the other hand, given the above equations, a person skilled in the art can easily obtain an optimal diameter of the hub for an assembly, where the length of the hub and the thickness of the diaphragm portions have previously been calculated.

Inasmuch as the present invention is subject to many variations, modifications and changes in detail, it is intended that all matter described throughout this specification and shown in the accompanying drawings be interpreted as illustrative only and not in a limiting sense. Accordingly, it is intended that the invention be limited only by the spirit and scope of the appended claims.

I claim:

1. In a pathlength controller for a ring laser gyro having an assembly including an internal annular space for bounding a central hub and defining transverse upper and lower diaphragm portions in spaced coaxial relation, a mirror mounted on a first substantially planar surface of the assembly encircled by the lower diaphragm portion, transducer means mounted on a second surface of the assembly opposite to the first surface for applying a force through the assembly to translatedly deflect the mirror so as to control predefied pathlengths of laser beams circulating in the gyro, a method of eliminating tilting of the mirror due to an unintended moment resulted from the force being applied through the assembly, the method comprising the steps of:

predetermining a diameter of the hub;

selecting a first length for the hub;

calculating a first angle of tilt of the mirror, due to the unintended moment, based on the predetermined diameter and the first length;

selecting a second length for the hub;

calculating a second angle of tilt of the mirror, due to the unintended moment, based on the predetermined diameter and the second length, the second angle having an opposed sense to the first angle; and extrapolating from the first and second angles a third length for the hub, the third length being an optimal length unaffected by the unintended moment.

2. The method according to claim 1, wherein, for each of the tilte angle calculating steps, the method further comprises the steps of:

calculating the angular tilt due to radial compliance of the diaphragm portions;

calculating the angular tilt due to shear compliance of the hub;

calculating the angular tilt due to bending compliance of the hub; and summing the respective angular tilts of the radial compliance, the shear compliance and the bending compliance to obtain the angle.

3. The method according to claim 2, wherein the angular tilt due to the radial compliance of the diaphragm portons is obtained from the formula $$\alpha = \frac{M}{\frac{L^2}{C_1 r + C_2 r} + k_1 a + k_2 a}$$

where $\alpha$ = angular tilt due to the radial compliance of the diaphragm portions;

M = unintended moment;

L = length of hub;

$C_1$ = radial compliance constant for the upper diaphragm portion;

$C_2$ = radial compliance constant for the lower diaphragm portion;

r = change of position of the hub as function of force;

$k_1$ = angular stiffness constant for the upper diaphragm portion;

$k_2$ = angular stiffness constant for the lower diaphragm portion;

a = angular change of position as function as force.

4. The method according to claim 2, wherein the angular tilt due to the shear compliance of the hub is obtained from the formula $$\beta = \frac{M}{\frac{GAL}{f} + k_1 a + k_2 a}$$

where
$\beta$ = angular tilt due to the shear compliance of the hub;
M = unintended moment;
G = shear compliance factor;
A = area of the hub;
L = length of hub;
f = shear factor;
$k_1$ = angular stiffness constant for the upper diaphragm portion;
$k_2$ = angular stiffness constant for the lower diaphragm portion;
a = angular change of position as function of force.

5. The method according to claim 2, wherein the angular tilt due to the bending compliance of the hub is obtained from the formula $$\theta = \frac{LM}{6EI\left(1 + \frac{Lk_1 a}{3EI} + \frac{Lk_2 a}{3EI}\right)}$$

where
$\theta$ = angular tilt due to the bending compliance of the hub;
L = length of the hub;
M = unintended moment;
E = Young's modulus;
I = modulus of elasticity;
$k_1$ = angular stiffness constant for the upper diaphragm portion;
$k_2$ = angular stiffness constant for the lower diaphragm portion;
a = angular change of position as function of force.

6. The method according to claim 1, wherein the extrapolating step comprises the steps of:
summing the values of the respective tilt angles;
dividing one of the tilt angle values by the summed tilt angle values;
summing the divided one tilt angle value with the selected length of the hub which corresponds to the tilt angle value to obtain the optimal hub length.

7. In a pathlength controller for a ring laser gyro having an assembly including an internal annular space for bounding a central hub and defining transverse upper and lower diaphragm portions in spaced coaxial relation, a mirror mounted on a first substantially planar surface of the assembly encircled by the lower diaphragm portion, transducer means mounted on a second surface of the assembly opposite to the first surface for applying a force through the assembly to translatedly deflect the mirror for controlling predefined pathlengths of laser beams circulating in the gyro, a method of eliminating tilting of the mirror means due to an intended moment resulted from the force being applied through the assembly, the method comprising the steps of:
choosing a first diameter for the hub which will cause the mirror to tilt in a first direction in response to the unintended moment;
choosing a second diameter for the hub which will cause the mirror to tilt in a second direction, diametrically opposed to the first direction, in response to the unintended moment; and
extrapolating from the first and second diameters a third diameter for the hub, the third diameter providing an optimal diameter for effecting a translated deflection to the mirror with no tilt of the mirror being generated in any direction;
whereby the mirror is unaffected by the unintended moment.

8. The method according to claim 7, further comprising the step of:
selecting a length for the hub;
selecting a thickness for the diaphragm portions.

9. The method according to claim 8, wherein the extrapolating step further comprises the steps of:
measuring the angle of the tilt of the mirror in the first direction;
measuring the angle of the tilt of the mirror in the second direction;
summing the values of the measured tilt angles; and
equating the summed measured tilt angle values to the optimal hub diameter.

* * * * *